United States Patent
Date et al.

(10) Patent No.: US 8,090,029 B2
(45) Date of Patent: Jan. 3, 2012

(54) DYNAMIC IMAGE ENCODING DEVICE AND METHOD

(75) Inventors: Naoto Date, Kanagawa (JP); Wataru Asano, Kanagawa (JP); Shinichiro Koto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1631 days.

(21) Appl. No.: 11/411,032

(22) Filed: Apr. 26, 2006

(65) Prior Publication Data

US 2007/0058719 A1    Mar. 15, 2007

(30) Foreign Application Priority Data

Sep. 13, 2005   (JP) .................................. 2005-265911

(51) Int. Cl.
*H04N 7/18* (2006.01)
(52) U.S. Cl. ............................... 375/240.26; 375/240.01
(58) Field of Classification Search . 375/240.01–240.29
See application file for complete search history.

(56) References Cited

U.S. PATENT DOCUMENTS

| | | | |
|---|---|---|---|
| 5,978,029 A | 11/1999 | Boice et al. | |
| 6,040,861 A | 3/2000 | Boroczky et al. | |
| 6,459,733 B1 * | 10/2002 | Yokoyama et al. | 375/240.12 |
| 6,473,465 B1 * | 10/2002 | Takahashi | 375/240.28 |
| 6,625,214 B1 * | 9/2003 | Umehara et al. | 375/240.12 |
| 2002/0028023 A1 | 3/2002 | Kazayama et al. | |
| 2004/0057523 A1 | 3/2004 | Koto et al. | |
| 2004/0258156 A1 | 12/2004 | Chujoh et al. | |

FOREIGN PATENT DOCUMENTS

| | | |
|---|---|---|
| JP | 11-177989 | 7/1999 |
| JP | 2002-84544 | 3/2002 |

OTHER PUBLICATIONS

U.S. Appl. No. 11/535,796, filed Sep. 27, 2006, Koto, et al.
U.S. Appl. No. 11/535,856, filed Sep. 27, 2006, Koto, et al.
U.S. Appl. No. 11/527,471, filed Sep. 27, 2006, Koto, et al.
U.S. Appl. No. 11/527,469, filed Sep. 27, 2006, Koto, et al.
U.S. Appl. No. 11/527,470, filed Sep. 27, 2006, Koto, et al.
U.S. Appl. No. 11/527,557, filed Sep. 27, 2006, Koto, et al.
U.S. Appl. No. 11/535,922, filed Sep. 27, 2006, Koto, et al.
U.S. Appl. No. 11/535,906, filed Sep. 27, 2006, Koto, et al.
U.S. Appl. No. 11/535,862, filed Sep. 27, 2006, Koto, et al.
U.S. Appl. No. 11/535,908, filed Sep. 27, 2006, Koto, et al.
U.S. Appl. No. 11/527,702, filed Sep. 27, 2006, Koto, et al.
U.S. Appl. No. 11/535,821, filed Sep. 27, 2006, Koto, et al.
U.S. Appl. No. 11/535,894, filed Sep. 27, 2006, Koto, et al.
U.S. Appl. No. 11/527,612, filed Sep. 27, 2006, Koto, et al.

* cited by examiner

*Primary Examiner* — Andy Rao
(74) *Attorney, Agent, or Firm* — Oblon, Spivak, McClelland, Maier & Neustadt, L.L.P.

(57) ABSTRACT

A fade detection unit performs fade detection, and in a case where a judgment of fade-in has been made, an encoding control unit notifies a motion detection unit to perform encoding in a reverse order to a display order. The fade detection unit performs the fade detection, and in the case where the judgment of the fade-in or fade-out has been made, the encoding control unit notifies the motion detection unit to perform encoding while importance is attached to a prediction from an image having a larger information amount in a B picture.

2 Claims, 16 Drawing Sheets

DYNAMIC IMAGE ENCODING DEVICE AND METHOD

CROSS REFERENCE TO RELATED APPLICATIONS

This application is based upon and claims the benefit of priority from the prior Japanese Patent Application No. 2005-265911, filed on Sep. 13, 2005; the entire contents of which are incorporated herein by reference.

TECHNICAL FIELD

The present invention relates to a dynamic image encoding device and method which effectively encodes a fade portion of the dynamic images.

DESCRIPTION OF THE BACKGROUND

Dynamic image is encoded using prediction between images of the dynamic image in order to reduce redundancy in a time direction. However, in a fade-in or fade-out portion of the dynamic image, a difference value between images becomes larger than that in normal dynamic images, and it is difficult to reduce the redundancy in the time direction, and consequently, the encoding efficiency is lowered, the picture quality is degraded and the amount of generated code is increased.

In order to keep the picture quality of the dynamic images to be constant, following methods have been proposed.

(1) A method in which in a fade-in portion, encoding is performed by only in-picture prediction (see, for example, Japanese Patent Application Publication (KOKAI) JP-A-11-177989).

(2) A method in which a GOP structure of M=3 is changed into a GOP structure of M=2 (see, for example, Japanese Patent Application Publication (KOKAI) JP-A-2002-84544).

However, in the method (1), since the fade-in portion is encoded by only the intra prediction in order to keep the picture quality, the redundancy in the time direction can not be reduced, and in order to keep the picture quality, the amount of the generated code is increased.

In the method (2), when the fade-in portion is encoded, with respect to a B picture, distances to temporally forward and backward reference images become constant, and with respect to a linear fade image, efficient prediction becomes possible by bidirectional prediction. However, in a fade picture in which a luminance change is nonlinear, an improvement of prediction efficiency can not be expected, and with respect to a P picture, an improvement of encoding efficiency in a fade image can not be expected.

BRIEF SUMMARY OF THE INVENTION

According to embodiments of the present invention, a dynamic image encoding device for performing an intra-image prediction includes a fade-in detection unit configured to detect a fade-in portion of dynamic images, and an encoding unit configured to encode the fade-in portion of the dynamic image by using prediction from a temporally backward image.

According to embodiments of the present invention, a dynamic image encoding device for performing an intra-image prediction includes a fade-in detection unit configured to detect a fade-in portion of a dynamic image, a motion vector detection unit configured to detect, for each image in the fade-in portion, only a backward motion vector between the each image and a temporally forward image, and an encoding unit configured to encode the each image in the fade-in portion by using the backward motion vector.

According to embodiments of the present invention, a dynamic image encoding device for performing an intra-image prediction includes a fade-in detection unit configured to detect a fade-in portion of a dynamic image, a motion vector detection unit configured to detect, for each image in the fade-in portion, a backward motion vector between the each image and a temporally forward image and a forward motion vector between the each image and a temporally backward image, a detection accuracy control unit configured to control detection accuracy so that detection accuracy of the backward motion vector is higher than that of the forward motion vector; and an encoding unit configured to encode the each image in the fade-in portion by using both the backward motion vector and the forward motion vector.

According to embodiments of the present invention, a dynamic image encoding device for performing an inter prediction includes a fade-out detection unit to detect a fade-out portion of a dynamic image, a motion vector detection unit configured to detect, for each image in the fade-out portion, a forward motion vector between the each image and a temporally backward image, and an encoding unit configured to encode the each image in the fade-out portion by using the forward motion vector.

According to embodiments of the present invention, a dynamic image encoding device for performing an inter prediction includes a fade-out detection unit configured to detect a fade-in portion of a dynamic image, a motion vector detection unit configured to detect, for each image in the fade-out portion, a backward motion vector between the each image and a temporally forward image and a forward motion vector between the each image and a temporally backward image, a detection accuracy control unit configured to control detection accuracy so that detection accuracy of the forward motion vector is higher than that of the backward motion vector, and an encoding unit configured to encode the each image in the fade-out portion by using the backward motion vector or both the backward motion vector and the forward motion vector.

According to embodiments of the present invention, in the fade of the dynamic image, the encoding efficiency can be greatly improved.

BRIEF DESCRIPTION OF THE DRAWINGS

FIG. 10 is a view showing a prediction structure of fade-in.

DETAILED DESCRIPTION OF THE INVENTION

Hereinafter, embodiments of a dynamic image encoding device of the present invention will be described with reference to the accompanying drawings.

In the present specification, the term "image" indicates a concept including "picture", "frame" and "field".

First Embodiment

Hereinafter, a dynamic image encoding device 100 of a first embodiment will be described with reference to FIGS. 1, 2, 10, 11 and 13.

(1) Structure of the Dynamic Image Encoding Device 100

Figure 1:
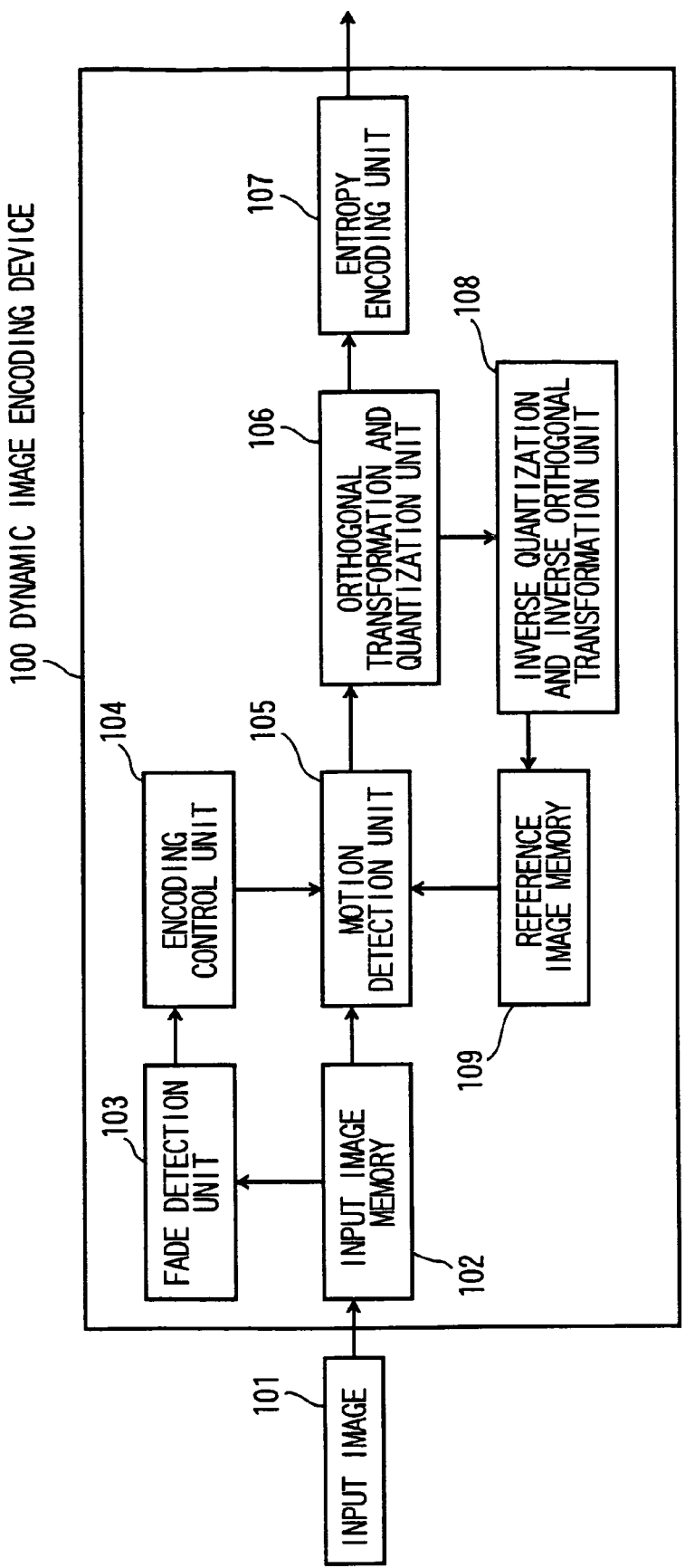
FIG. 1 is a block diagram showing a structure of a dynamic image encoding device of a first embodiment.

FIG. 1 is a block diagram showing the structure of the dynamic image encoding device 100 of this embodiment.

As shown in FIG. 1, the dynamic image encoding device 100 includes an input image memory 102, a fade detection unit 103, an encoding sequence control unit 104, a motion detection unit 105, an orthogonal transformation and quantization unit 106, an entropy encoding unit 107, an inverse quantization and inverse orthogonal transformation unit 108, and a reference image memory 109.

The input image memory 102 stores an input image 101 of an input dynamic image to be encoded.

The fade detection unit 103 calculates the information amount of the each input image stored in the input image memory 102, and judges, based on the calculated information amount, whether the input dynamic image fades or not.

In the case where the dynamic image fades, the encoding control unit 104 controls the encoding so that priority of an intra prediction from an image having a large information amount to an image having a small information amount is higher than an intra prediction from the image having the small information amount to the image having the large information amount.

The motion detection unit 105 performs a motion vector detection using the input image stored in the input image memory 102 and a reference image stored in the reference image memory 109 and generation of a prediction error.

The orthogonal transformation and quantization unit 106 performs an orthogonal transformation on the inputted prediction error and performs quantization of its transformation coefficient.

The entropy encoding unit 107 performs entropy encoding of the inputted transformation coefficient, the motion vector information and the like, and generates a code string.

The inverse quantization and inverse orthogonal transformation unit 108 performs inverse quantization of the transformation coefficient quantized by the orthogonal transformation and quantization unit 106, decodes the transformation coefficient, performs the inverse orthogonal transformation processing on the decoded transformation coefficient, decodes the prediction error, adds the decoded prediction error and the reference image, and generate a decoded image.

The reference image memory 109 stores the generated decoded image as the reference image.

Figure 2:
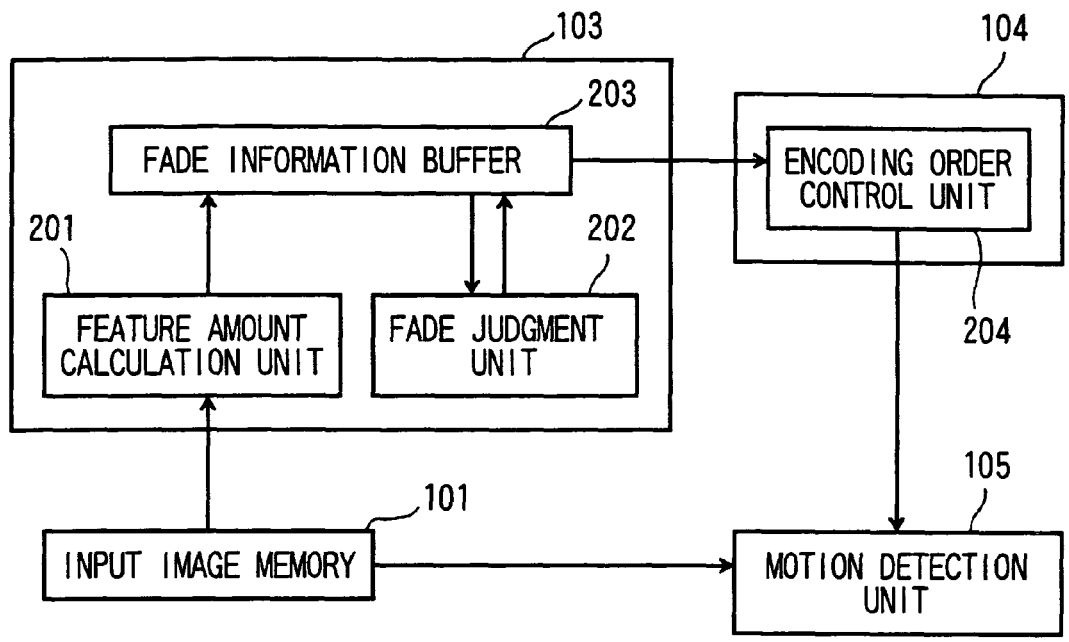
FIG. 2 is a block diagram showing a structure of a fade detection unit and an encoding control unit of the first embodiment.

FIG. 2 shows the structure of the fade detection unit 103 and the encoding control unit 104.

As shown in FIG. 2, the fade detection unit 103 includes an information amount calculation unit 201, a fade judgment unit 202 and a fade information buffer 203.

(2) Flow of Processing of the Fade Detection Unit 103 and the Encoding Control Unit 104

Figure 13:
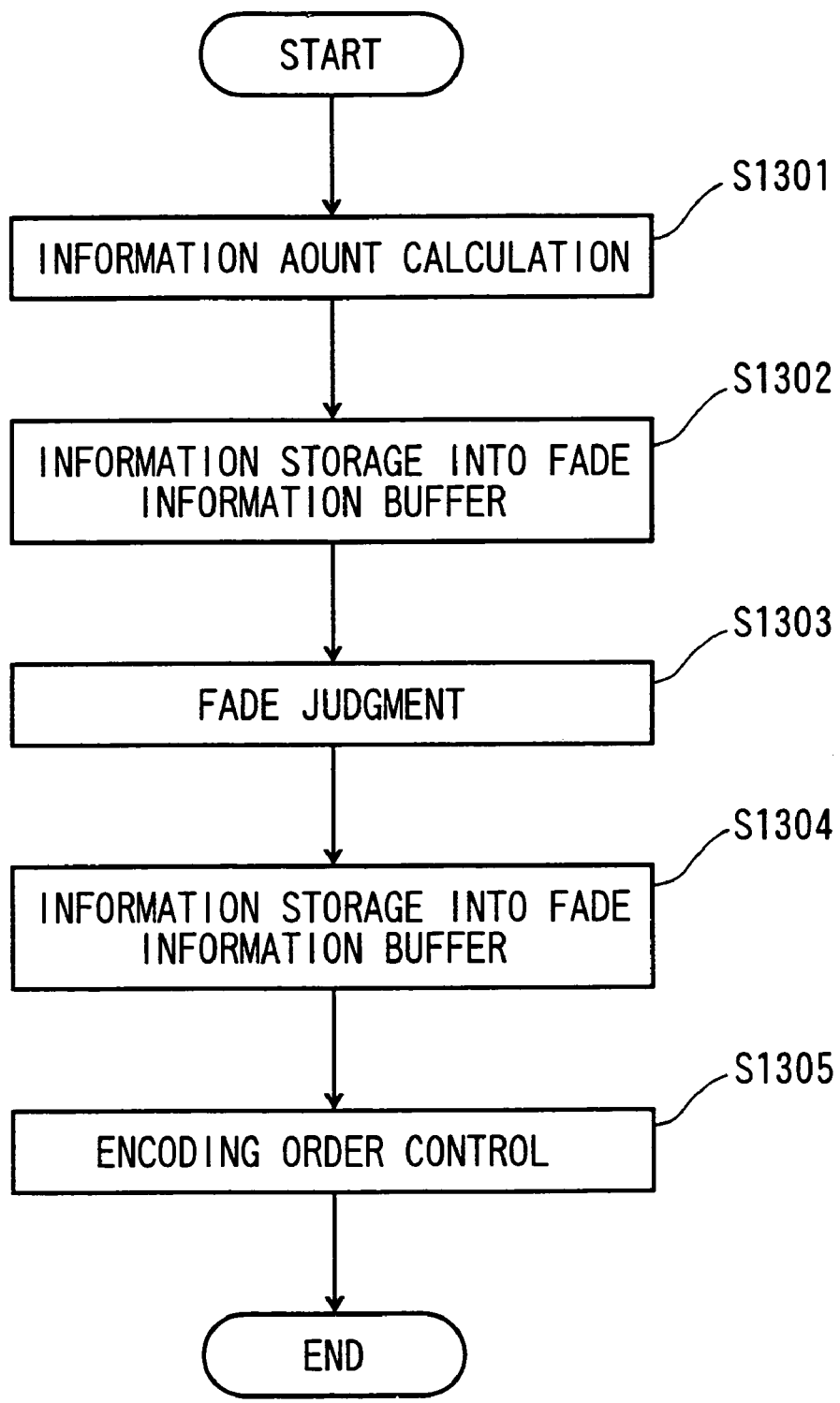
FIG. 13 is a flowchart showing a processing of the fade detection unit and an encoding order control unit of the first embodiment.

FIG. 13 shows a flowchart of the fade detection unit 103 and the encoding control unit 104.

(2-1) Step S1301

The information calculation unit 201 calculates the information amount of the input image from the input image memory 101.

As an example of the information amount, there is brightness value dispersion of an image indicated by expression (1).

$$\sigma^2 = \sum_{y=0}^{H} \sum_{x=0}^{W} (Y(x, y) - E)^2 \qquad (1)$$

Where, $\sigma^2$ denotes brightness value dispersion of an image, $Y(x, y)$ denotes a brightness component of a pixel of the image at a position $(x, y)$, H denotes the number of pixels of the image in the vertical direction, W denotes the number of pixels of the image in the horizontal direction, and E denotes an in-plane average value of the brightness component of the image.

(2-2) Step S1302

The calculated information amount and an image ID are stored in the fade information buffer 203. Here, the image ID is such a value that an image can be uniquely identified from the image ID, and is, for example, the display number of the image.

(2-3) Step S1303

The fade judgment unit 202 judges whether the each input image is in the fade portion of the input dynamic image or not using the information amount corresponding to N (for example, N=15) images continuous in terms of time and stored in the fade information buffer 203.

In the case where the information amount corresponding to the N images continuous in terms of time monotonically increases for the N consecutive images, a judgment of fade-in is made.

On the contrary, in the case where the information amount corresponding to the N images continuous in terms of time monotonically decreases for the N consecutive images, a judgment of fade-out is made.

(2-4) Step S1304

With respect to the N images judged to fade in or fade out, a fade type is stored in the fade information buffer 203.

The fade type is a value to discriminate among "no fade", "fade-in" and "fade-out", and the initial value indicates "state of no fade". After the judgment of "fade-in" or "fade-out" is made, the fade type is changed.

After the fade judgment unit 202 functions, the fade information buffer 203 stores the image ID, the information amount and the fade type.

(2-5) Step S1305

The encoding control unit 104 shown in FIG. 2 includes the encoding sequence control unit 204. The encoding sequence control unit 204 determines the order of effectively encoding the image based on the information of the fade information buffer 203.

With respect to the images judged to fade in, the encoding control unit notifies the motion detection unit 105 to perform encoding in the order of predicting an image having a small information amount from an image having a large information amount. This corresponds to the encoding of the fade-in portion in the reverse order to the display order. For example, the image ID is notified to the motion detection unit 105 in such an order that first, the final image in the fade-in portion is encoded by only in-picture prediction (I picture), next, a processing is continued such that the second image from the last is encoded by inter prediction (P picture) and the third image from the last is encoded by inter prediction (P picture), and finally, the first image of the fade portion in terms of time is encoded.

Figure 10:
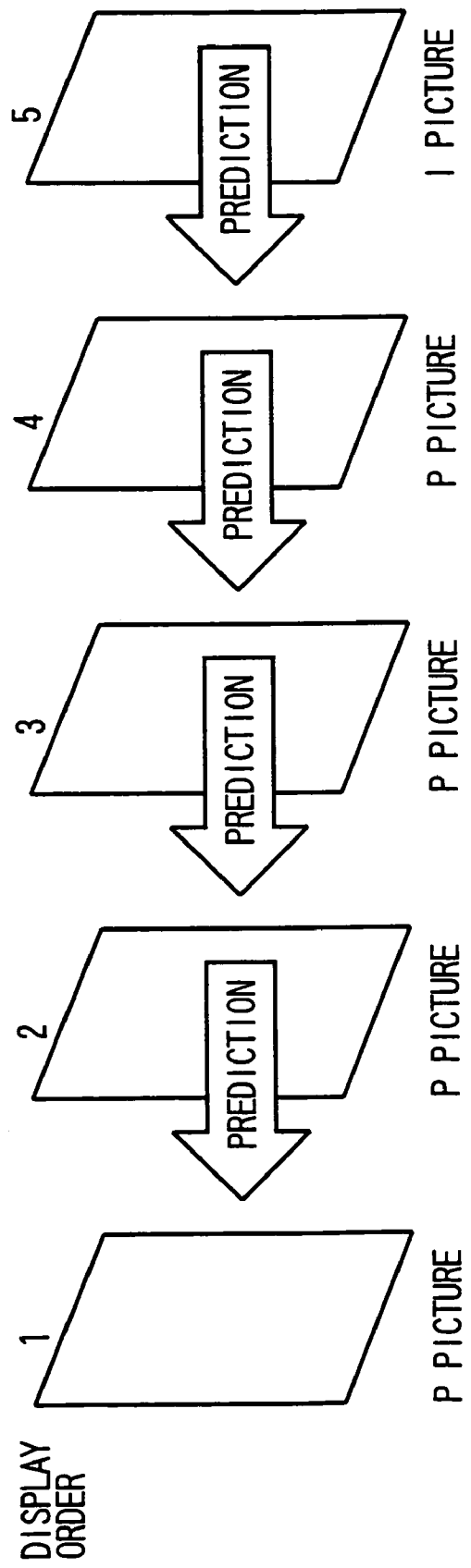

FIG. 10 shows this encoding order. Although this can not be performed in the conventional dynamic image encoding system such as MPEG-2 or MPEG-4, this has become possible in H.264 or the like which has been standardized in recent years. Although the foregoing example is the example of the case using only the P picture, also in the encoding with a B picture, the reverse order encoding can be similarly applied.

The motion detection unit 105 reads the input image from the input image memory 101 in accordance with the order indicated by the encoding sequence control unit 104, and performs the motion detection processing.

(3) Effects of the embodiment

According to this embodiment, the images judged to fade in can be prediction encoded in the reverse order to the display order. When the prediction encoding is performed in the reverse order to the display order, an image having a small information amount is predicted from an image having a large information amount, and the efficiency is good.

Figure 11:
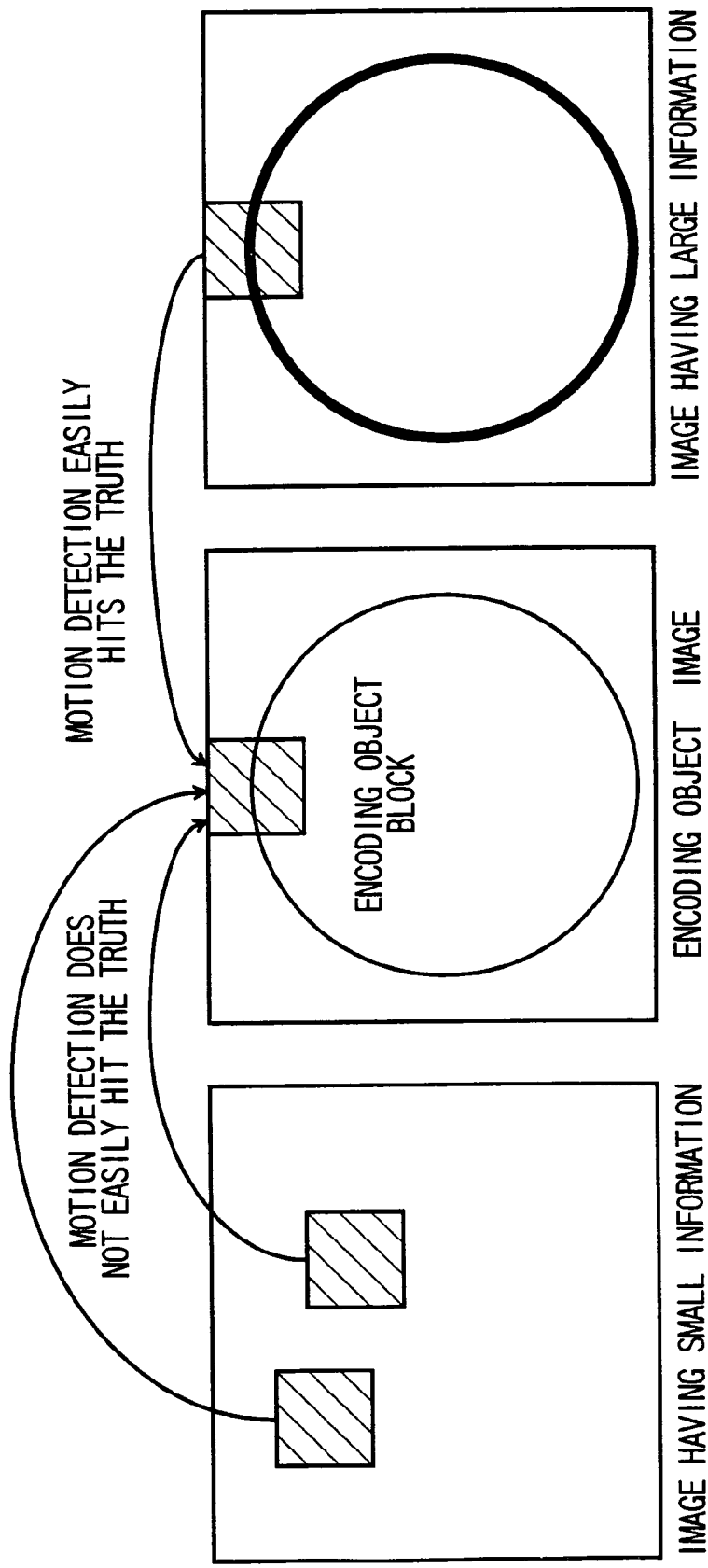
FIG. 11 is a view showing a state of motion detection.

This is because a desired motion vector is detected more easily in the prediction direction in which the motion detection is performed from the image having the large information amount (pattern is detailed) than in the prediction direction in which the motion detection is performed from the image having the small information amount (pattern is not detailed), as shown in FIG. 11.

By this, as compared with the case where the fade-in portion is encoded in a normal order with respect to the time direction, the encoding efficiency of the P picture is improved.

Second Embodiment

Next, a second embodiment of the invention will be described with reference to FIGS. 3 and 12.

(1) Structure of Dynamic Image Encoding Device 100

Figure 3:
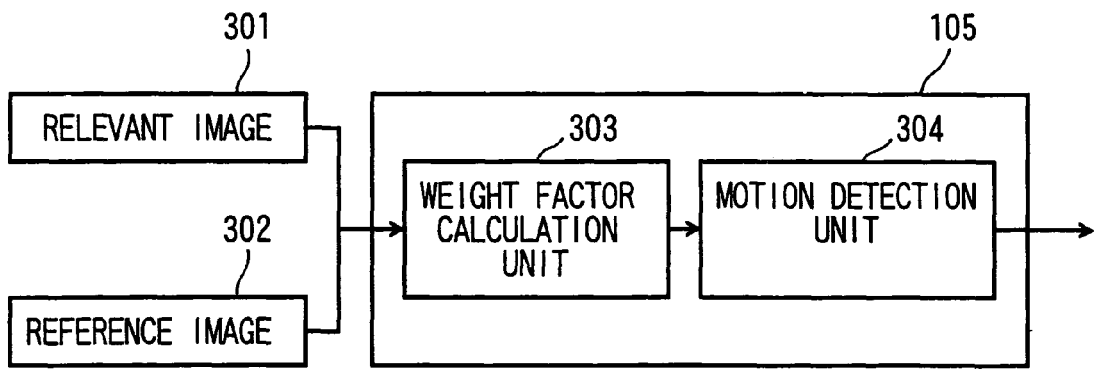
FIG. 3 is a block diagram showing a structure of a motion detection unit of a second embodiment.

In the second embodiment, although the structure is basically the same as the first embodiment shown in FIG. 1, the motion detection unit 105 of the first embodiment shown in FIG. 1 includes a weight factor calculation unit 303 and a motion detection unit 304 as shown in FIG. 3.

The weight factor calculation unit 303 calculates a weight factor based on the ratio of the information amounts from a relevant image 301 and a reference image 302. The weight factor is a value necessary in a case where a weighted prediction is performed in the dynamic image encoding.

(2) Example of the Weighted Prediction

As an example of the weighted prediction, "Weighted Prediction" of H. 264 can be named.

Figure 12:
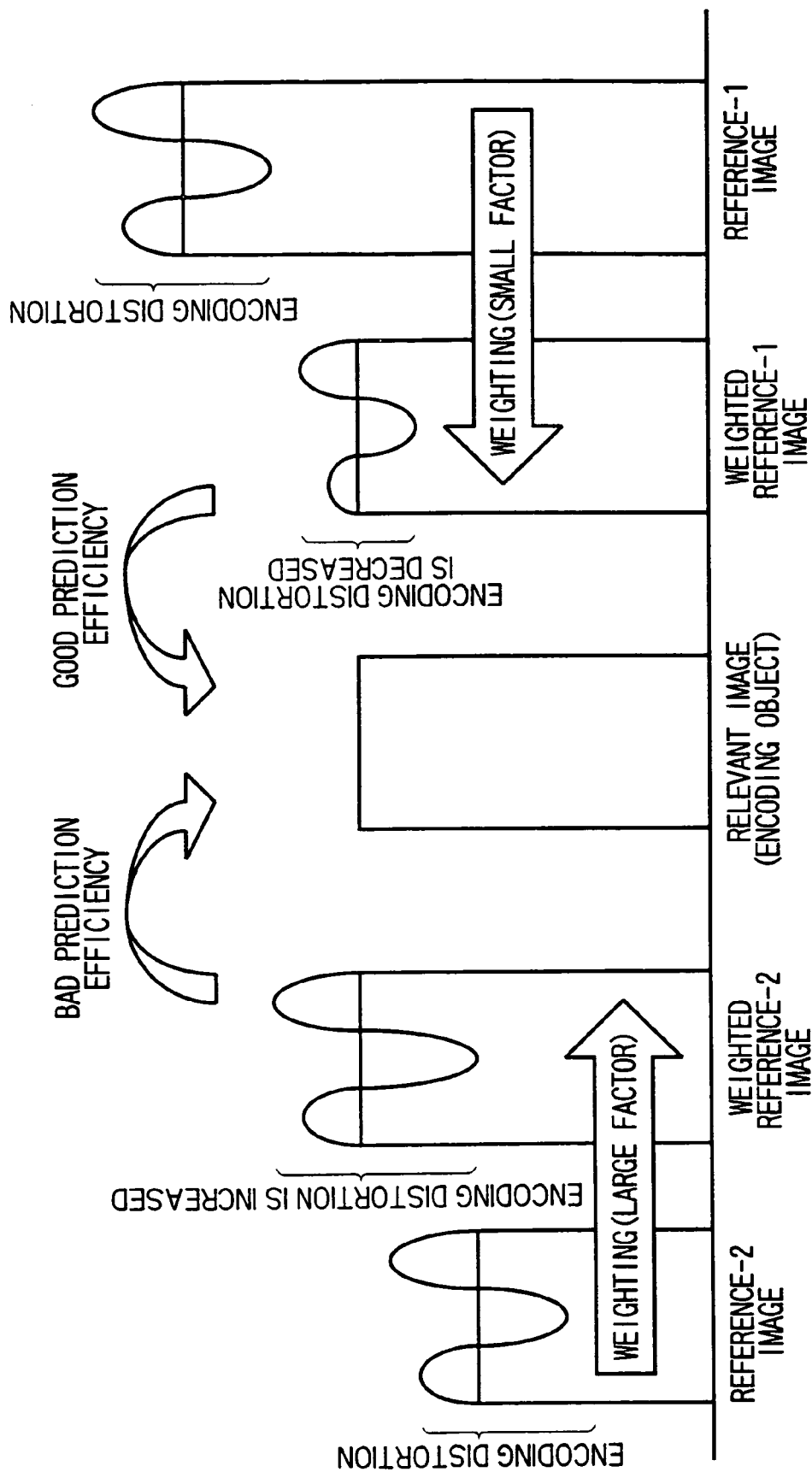
FIG. 12 is a view showing prediction efficiency of weighted prediction.

As shown in FIG. 12, in an image (in FIG. 12, weighted reference-2 image) generated by assigning a weighting factor w (w>1) larger than 1 to an image (in FIG. 12, reference-2 image) having a smaller information amount, encoding distortion is increased.

On the contrary, in an image (in FIG. 12, weighted reference-1 image) generated by assigning a weight factor w (w<1) smaller than 1 to an image (in FIG. 12, reference-1 image) having a larger information amount, encoding distortion is decreased.

By this, it is understood that as compared with the prediction from the weighted reference-2 image, the prediction from the weighted reference-1 image does not receive the influence of the encoding distortion, and therefore, the prediction error signal is suppressed to be small, and the efficiency is good. In order to use this characteristic, in this embodiment, when the fade-in portion is detected, encoding is performed in the reverse order to the display order by using the weighted prediction.

(3) Motion Detection Unit 304

The motion detection unit 304 performs the motion detection processing and the generation of the prediction error signal by the relevant image and the weighted reference image. Besides, normal motion detection can also be performed without assigning weights to the reference image by the weight factor calculation unit 303. The prediction error signal calculated by the motion detection unit 304 is sent to the orthogonal transformation and quantization unit 106.

(4) Effects of the Embodiment

According to this embodiment, the image judged to fade in is prediction encoded in the reverse order to the display order and with the weighted prediction. By this, as compared with the case where the fade-in portion is encoded in the normal order with respect to the time direction, the encoding efficiency of the P picture is improved.

Third Embodiment

Next, a third embodiment of the invention will be described with reference to FIGS. 4, 11 and 14.

Figure 4:
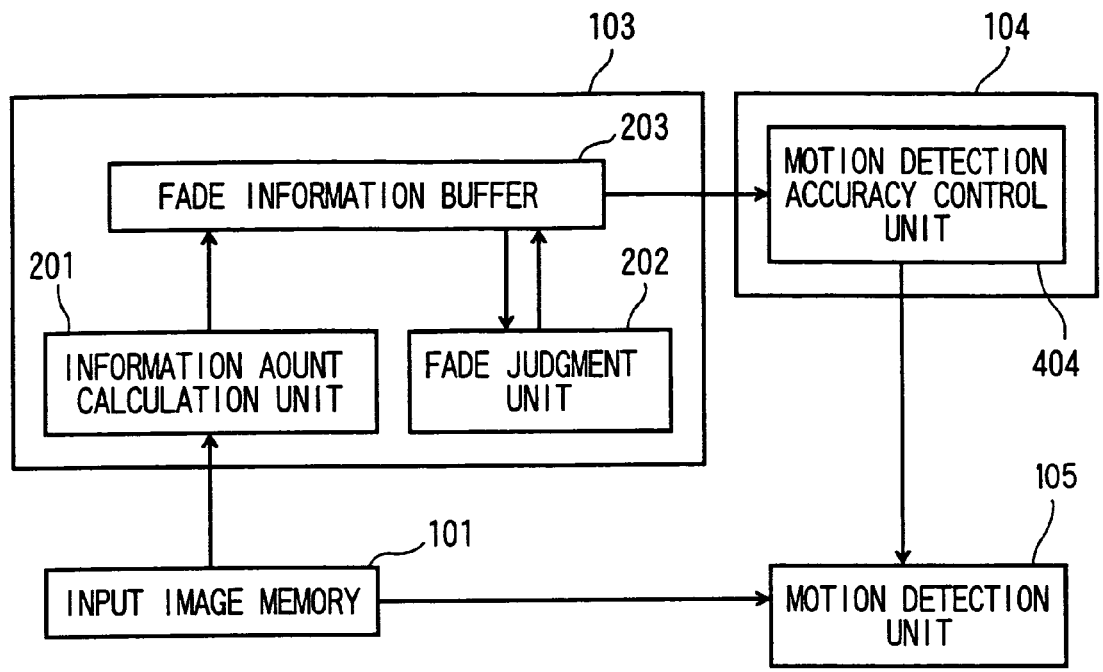
FIG. 4 is a block diagram showing a structure of a fade detection unit and an encoding control unit of a third embodiment.

In the third embodiment, the structure is basically the same as the first embodiment shown in FIG. 1, and the encoding order control unit 204 in the first embodiment shown in FIG. 2 is replaced by a motion detection accuracy control unit 404 as shown in FIG. 4.

Besides, a motion detection unit 105 is constructed such that the accuracy of motion detection can be changed by an instruction from the motion detection accuracy control unit 404.

Figure 14:
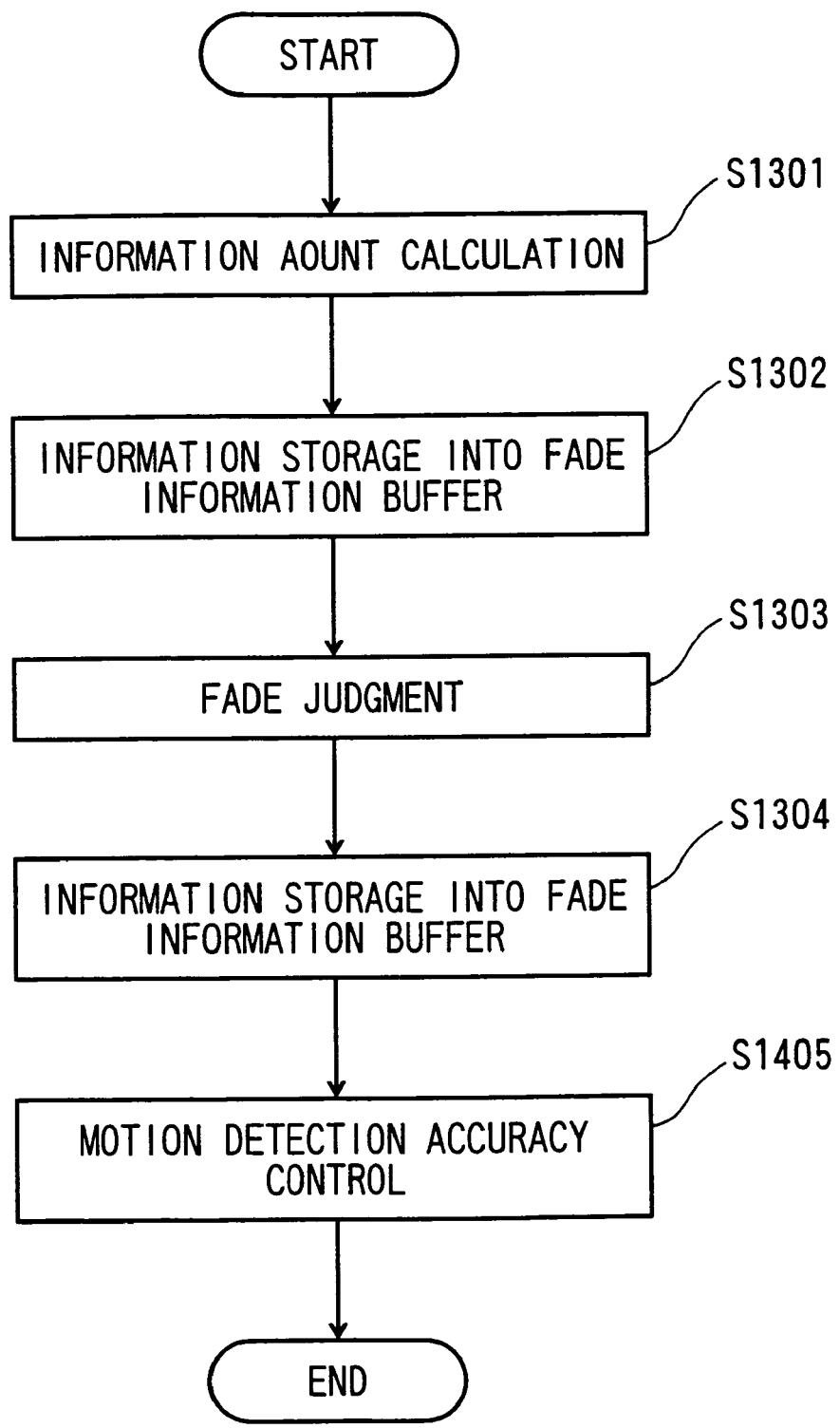
FIG. 14 is a flowchart showing a processing of the fade detection unit and a motion detection accuracy control unit of the third embodiment.

FIG. 14 is a flowchart of a fade detection unit 103 and an encoding control unit 104.

When a fade-in portion is detected, the motion detection accuracy control unit 404 notifies the motion detection unit 105 to perform encoding while the motion detection accuracy in a temporally reverse order is raised as compared with the motion detection accuracy in a temporally normal order (step S1405).

Besides, when fade-out is detected, the motion detection accuracy control unit 404 notifies the motion detection unit 105 to perform encoding while the motion detection accuracy in the temporally normal order is raised as compared with the motion detection accuracy in the temporally reverse order (step S1405).

As shown in FIG. 11, a desired motion vector is detected more easily in the prediction direction in which the motion detection is performed from the image having the large information amount (pattern is detailed) than in the prediction direction in which the motion detection is performed from the image having the small information amount (pattern is not detailed). For example, consideration is given to the case where the motion detection of the B picture is performed at the time of fade-in. Although the B picture can take a forward image and a backward image as a reference image, a desirable motion vector is detected more easily in the prediction direction from the backward image having the large information amount than in the prediction direction from the forward image having the small information amount.

In this embodiment, by reducing the processing amount of the motion detection from the image having the small information amount to the image having the large information amount, in which it is difficult to obtain an accurate motion vector, the calculation amount of the B picture is reduced, while the encoding efficiency is kept.

Fourth Embodiment

Next, a fourth embodiment of the invention will be described with reference to FIGS. 5, 11 and 15.

Figure 5:
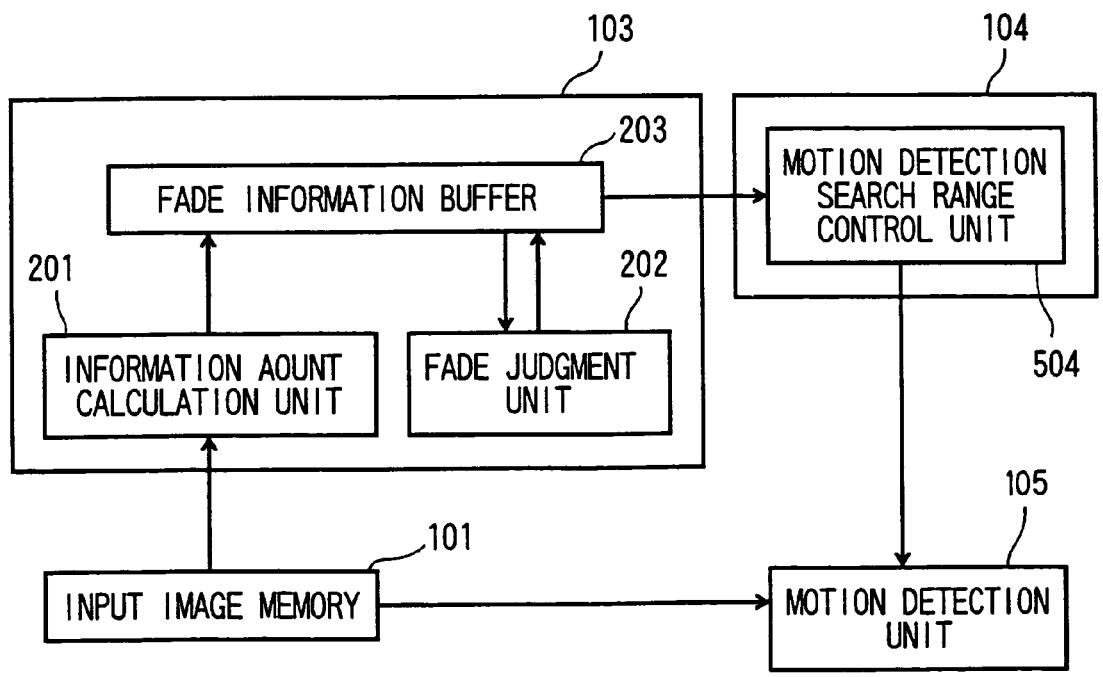
FIG. 5 is a block diagram showing a fade detection unit and an encoding control unit of a fourth embodiment.

In the fourth embodiment, the structure is basically the same as the first embodiment shown in FIG. 1, and the encoding order control unit 204 of the first embodiment shown in FIG. 2 is replaced by a motion detection search range control unit 504 as shown in FIG. 5.

Besides, a motion detection unit 105 is constructed such that the search range of motion detection can be changed by an instruction from the motion detection search range control unit 504.

Figure 15:
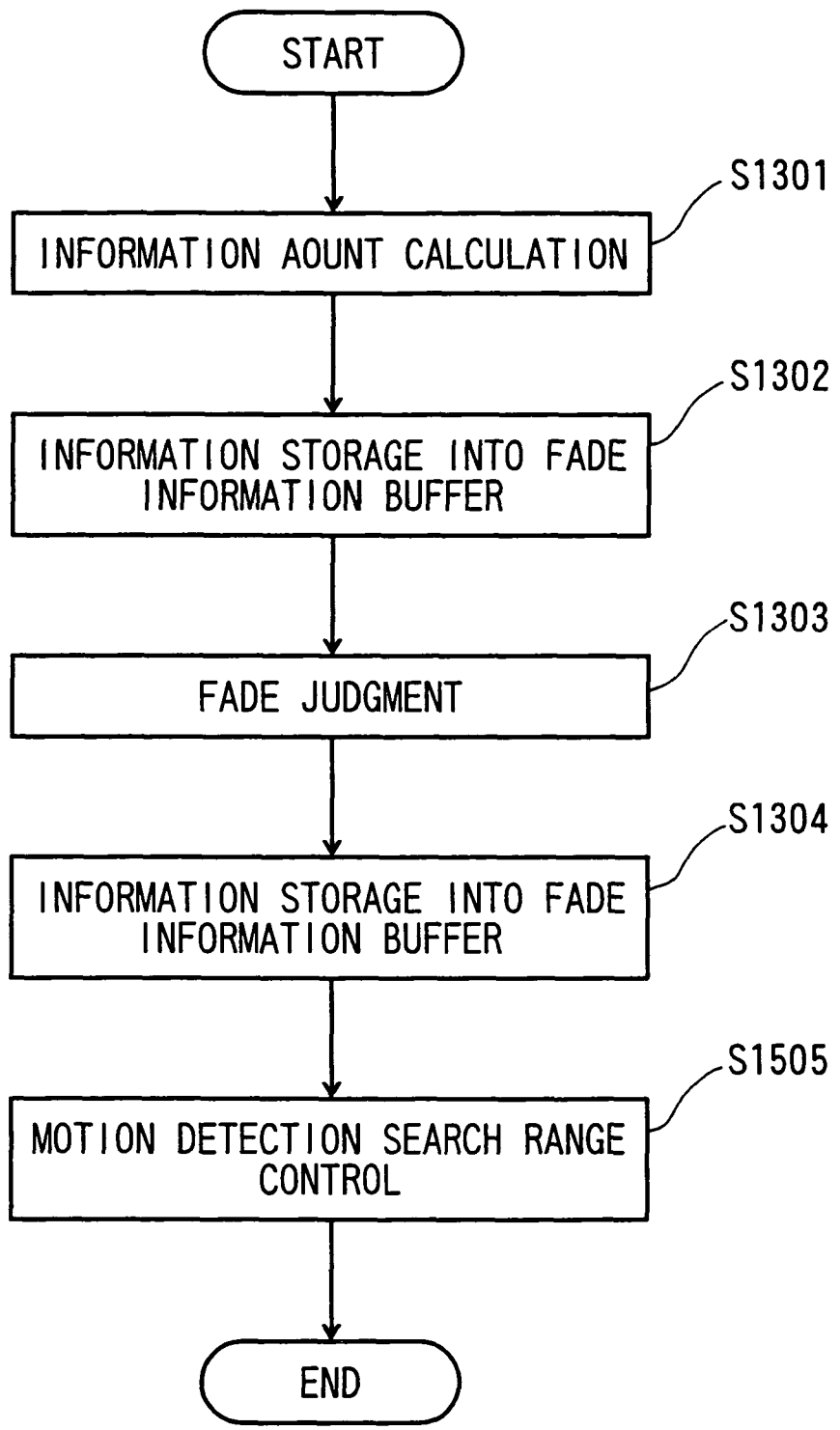
FIG. 15 is a flowchart showing a processing of the fade detection unit and a motion detection search range control unit of the fourth embodiment.

FIG. 15 is a flowchart of a fade detection unit 103 and an encoding control unit 104.

When a fade-in portion is detected, the motion detection search range control unit 504 notifies the motion detection unit 105 to perform encoding while a motion detection search range in the temporally reverse order is extended as compared with a motion detection search range in the temporally normal order (step S1505).

Besides, when fade-out is detected, the motion detection search range control unit 504 notifies the motion detection unit 105 to perform encoding while a motion detection search range in the temporally normal order is extended as compared with a motion detection search range in the temporally reverse order (step S1505).

This is because as shown in FIG. 11, a desired motion vector is detected more easily in the prediction direction in which the motion detection is performed from the image having the large information amount (pattern is detailed) than in the prediction direction in which the motion detection is performed from the image having the small information amount (pattern is not detailed).

In this embodiment, by reducing the processing amount of the motion detection from the image having the small information amount to the image having the large information amount, in which it is difficult to obtain an accurate motion vector, the calculation amount of the B picture is reduced, while the encoding efficiency is kept.

Fifth Embodiment

Next, a fifth embodiment of the invention will be described with reference to FIGS. 6, 11 and 16.

Figure 6:
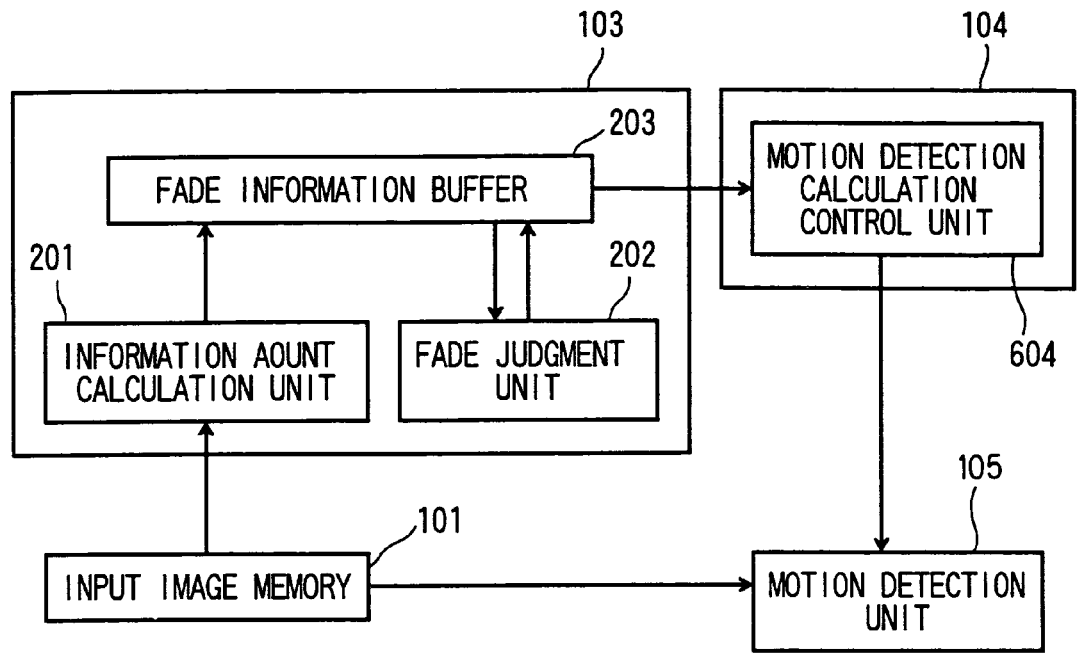
FIG. 6 is a block diagram showing a fade detection unit and an encoding control unit of a fifth embodiment.

In the fifth embodiment, the structure is basically the same as the first embodiment shown in FIG. 1, and the encoding order control unit 204 in the first embodiment shown in FIG. 2 is replaced by a motion detection calculation amount control unit 604 as shown in FIG. 6.

Besides, a motion detection unit 105 is constructed such that the calculation amount of motion detection can be changed by an instruction from the motion detection calculation amount control unit 604.

Here, the largeness and smallness of the calculation amount indicates the coarseness and denseness of the motion vector search, the deepness and shallowness of the hierarchical search, or the highness and lowness of the degree of thinning of block pixels at the time of block matching.

The coarseness and denseness of the motion vector search indicates, for example, a one-pixel accuracy (for example, 1 pel) search (coarseness, calculation amount is small) or a ½ pixel accuracy search (denseness, calculation amount is large).

The deepness and shallowness of the hierarchical search indicates, for example, a whole search (shallowness, calculation amount is large), or a two-step search (deepness, calculation amount is small) in which a fine search is performed after a rough search.

The highness and lowness of the degree of thinning of block pixels at the time of block matching indicates, for example, two-pixel thinning (lowness, calculation amount is large), or four-pixel thinning (highness, calculation amount is small).

Figure 16:
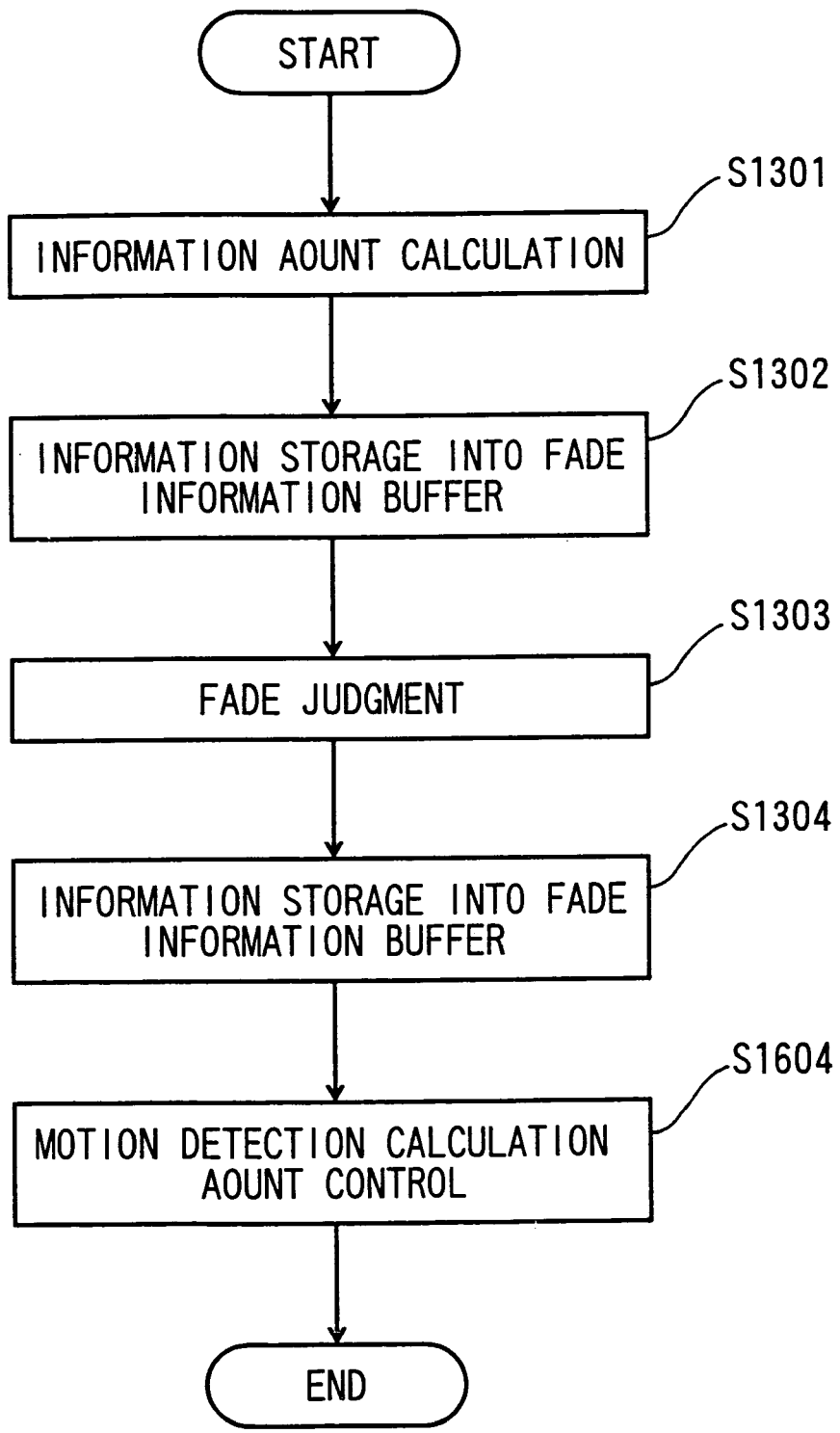
FIG. 16 is a flowchart showing a processing of the fade detection unit and a motion detection calculation amount control unit of the fifth embodiment.

FIG. 16 is a flowchart of a fade detection unit 103 and an encoding control unit 104.

When a fade-in portion is detected, the motion detection calculation amount control unit 604 notifies the motion detection unit 105 to perform encoding while the calculation amount of the motion detection in the temporally reverse order is made larger than the calculation amount of the motion detection in the temporally normal order (step S1605).

When fade-out is detected, the motion detection calculation amount control unit 604 notifies the motion detection unit 105 to perform encoding while the calculation amount of the motion detection in the temporally normal order is made larger than the calculation amount of the motion detection in the temporally reverse order (step S1605).

As shown in FIG. 11, a desired motion vector is detected more easily in the prediction direction in which the motion detection is performed from the image having the large information amount (pattern is detailed) than in the prediction direction in which the motion detection is performed from the image having the small information amount (pattern is not detailed). In this embodiment, by reducing the processing amount of the motion detection from the image having the small information amount to the image having the large information amount, in which it is difficult to obtain the accurate motion vector, the calculation amount of the B picture is reduced, while the encoding efficiency is kept.

Sixth Embodiment

Next, a sixth embodiment of the invention will be described with reference to FIGS. 7, 11 and 17.

Figure 7:
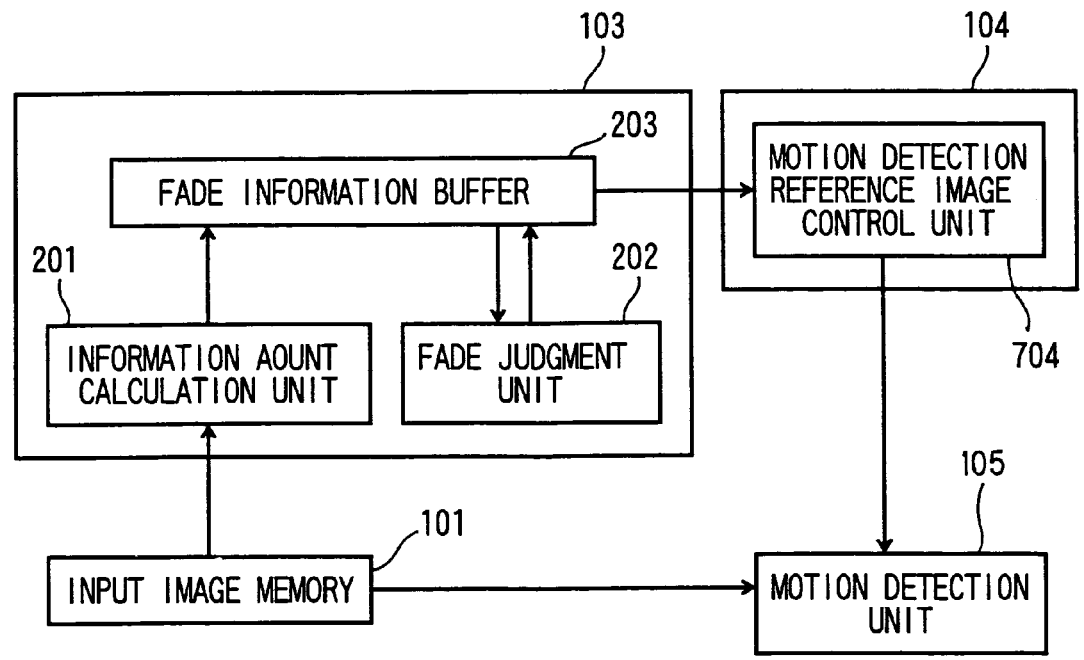
FIG. 7 is a block diagram showing a fade detection unit and an encoding control unit of a sixth embodiment.

In the sixth embodiment, the structure is basically the same as the first embodiment shown in FIG. 1, and the encoding order control unit 204 in the first embodiment shown in FIG. 2 is replaced by a motion detection reference image control unit 704 as shown in FIG. 7.

Besides, a motion detection unit 105 is constructed such that the number of reference images of motion detection can be changed by an instruction from the motion detection reference image control unit 704.

Figure 17:
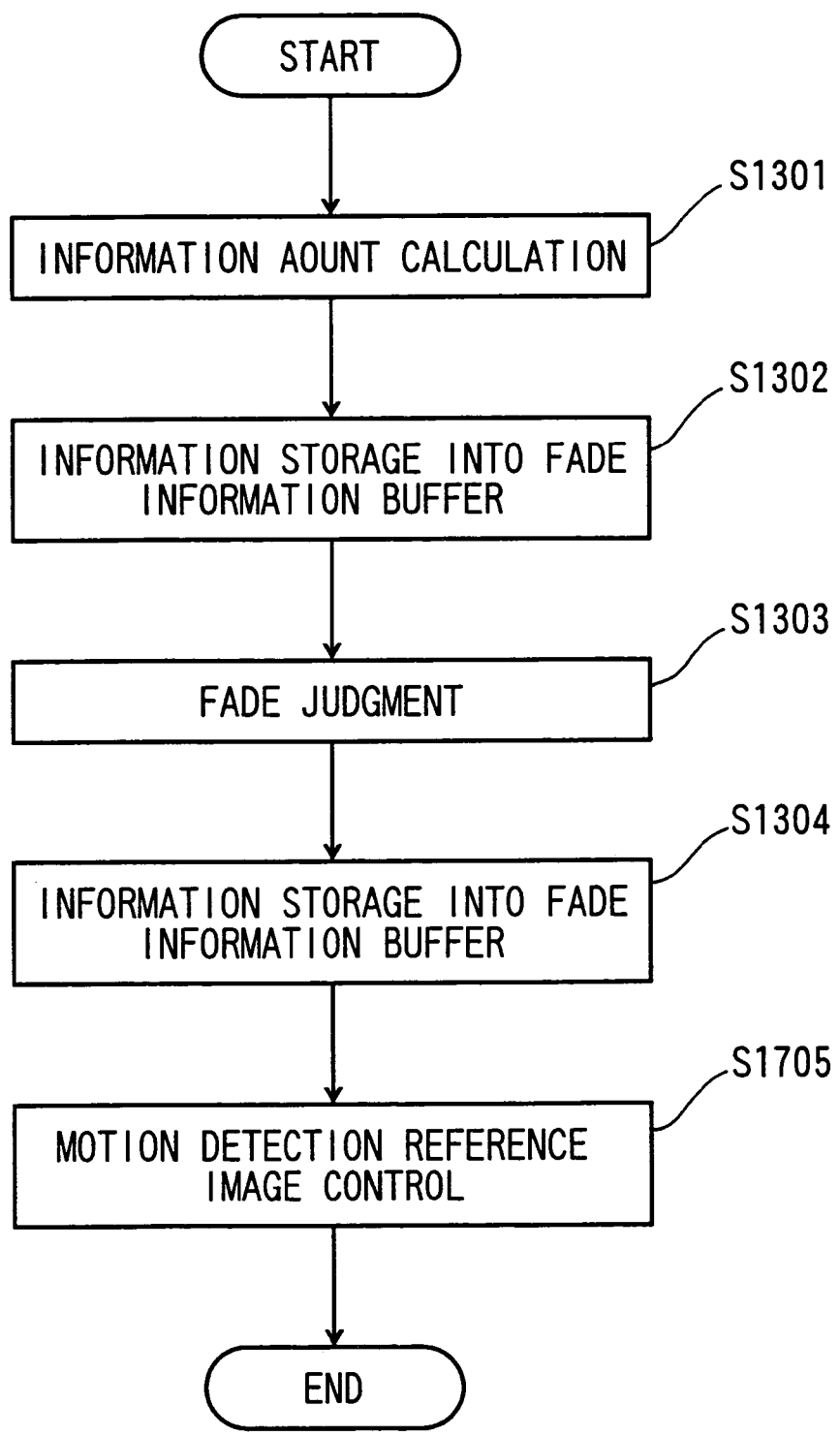
FIG. 17 is a flowchart showing a processing of the fade detection unit and a motion detection reference image control unit of the sixth embodiment.

FIG. 17 is a flowchart of a fade detection unit 103 and an encoding control unit 104.

When a fade-in portion is detected, the motion detection reference image control unit 704 notifies the motion detection unit 105 to perform encoding while the number of reference images of the motion detection processing in the temporally reverse order is made larger than the number of reference images of the motion detection processing in the temporally normal order (step S1705).

Besides, when fade-out is detected, the motion detection reference image control unit 704 notifies the motion detection unit 105 to perform encoding while the number of reference images of the motion detection processing in the temporally normal order is made larger than the number of reference images of the motion detection processing in the temporally reverse order (step S1705).

As shown in FIG. 11, a desired motion vector is detected more easily in the prediction direction in which the motion detection is performed from the image having the large information amount (pattern is detailed) than in the prediction direction in which the motion detection is performed from the image having the small information amount (pattern is not detailed). Then, in this embodiment, by reducing the processing amount of the motion detection from the image having the small information amount, in which it is difficult to obtain the accurate motion vector, the calculation amount of the B picture is reduced, while the encoding efficiency is kept.

Seventh Embodiment

Next, a seventh embodiment of the invention will be described with reference to FIGS. 8, 12 and 18.

Figure 8:
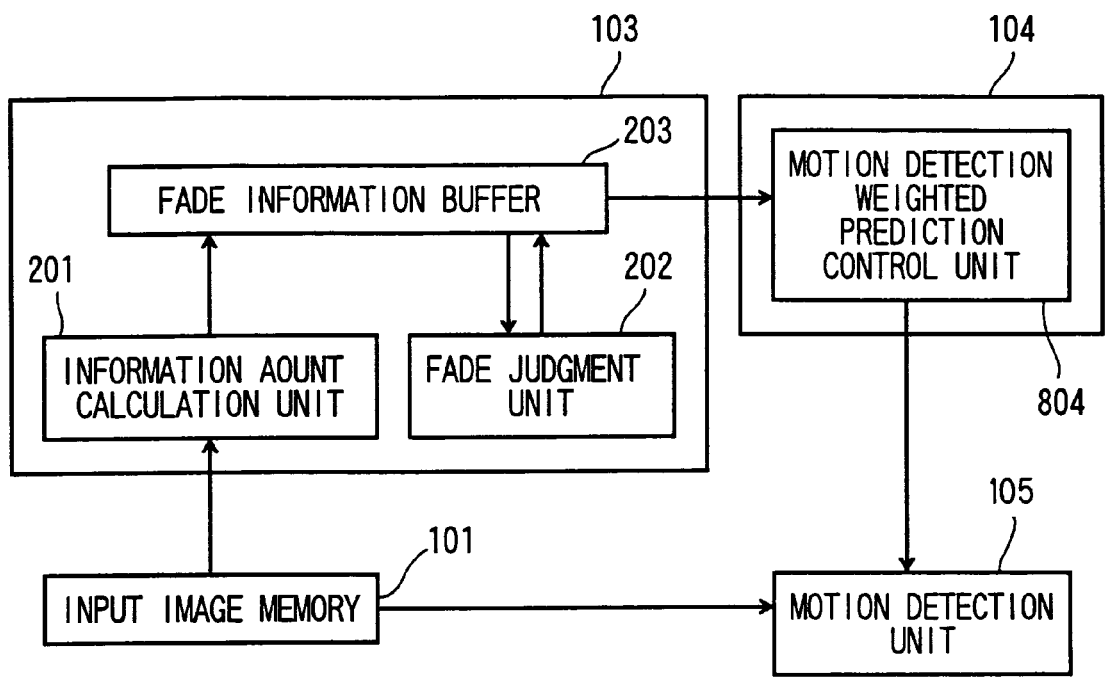
FIG. 8 is a block diagram showing a fade detection unit and an encoding control unit of a seventh embodiment.

In the seventh embodiment, the structure is basically the same as the first embodiment shown in FIG. 1, and the encoding order control unit 204 in the first embodiment shown in FIG. 2 is replaced by a weighted prediction control unit 804 as shown in FIG. 8.

Figure 18:
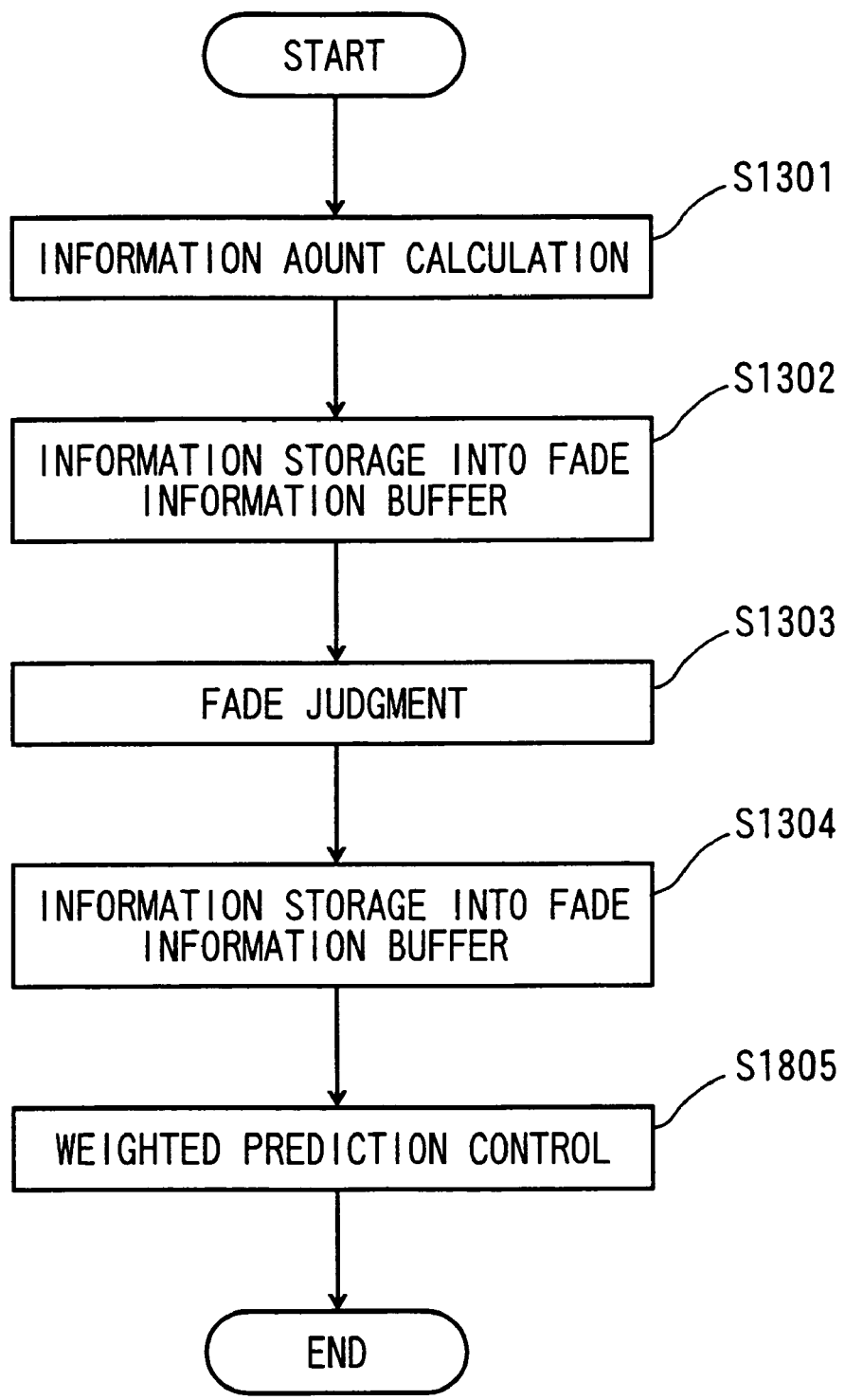
FIG. 18 is a flowchart showing a processing of the fade detection unit and a weighted prediction control unit of the seventh embodiment.

FIG. 18 is a flowchart of a fade detection unit 103 and an encoding control unit 104 of the embodiment.

When a fade-in portion is detected, the weighted prediction control unit 804 notifies the motion detection unit 105 not to apply a weighted prediction when the motion detection in the temporally normal order is performed, and to apply the weighted prediction when the motion detection in the temporally reverse order is performed (step S1805).

When fade-out is detected, the weighted prediction control unit 804 notifies the motion detection unit 105 not to apply the weighted prediction when the motion detection in the temporally reverse order is performed, and to apply the weighted prediction when the motion detection in the temporally normal order is performed (step S1805).

As shown in FIG. 12, in an image (in FIG. 12, weighted reference-2 image) generated by assigning a weight to an image (in FIG. 12, reference-2 image) having a smaller information amount, encoding distortion is increased. In an image (in FIG. 12, weighted reference-1 image) generated by assigning a weight to an image (in FIG. 12, reference-1 image) having a larger information amount, encoding distortion is decreased. Thus, from FIG. 12, it is understood that as compared with the prediction from the weighted reference-2 image having the smaller information amount, the prediction from the weighted reference-1 image having the larger information amount does not receive the influence of the encoding distortion, and accordingly, the prediction error signal is suppressed to be small, and the efficiency is good.

In this embodiment, the weighted prediction is not applied to the image having the small information amount, and the weighted prediction is applied to the image having the large information amount, and accordingly, the processing amount of the weighted prediction in the B picture can be reduced, while the encoding performance is kept.

Eighth Embodiment

Next, an eighth embodiment of the invention will be described with reference to FIGS. 9 and 19.

Figure 9:
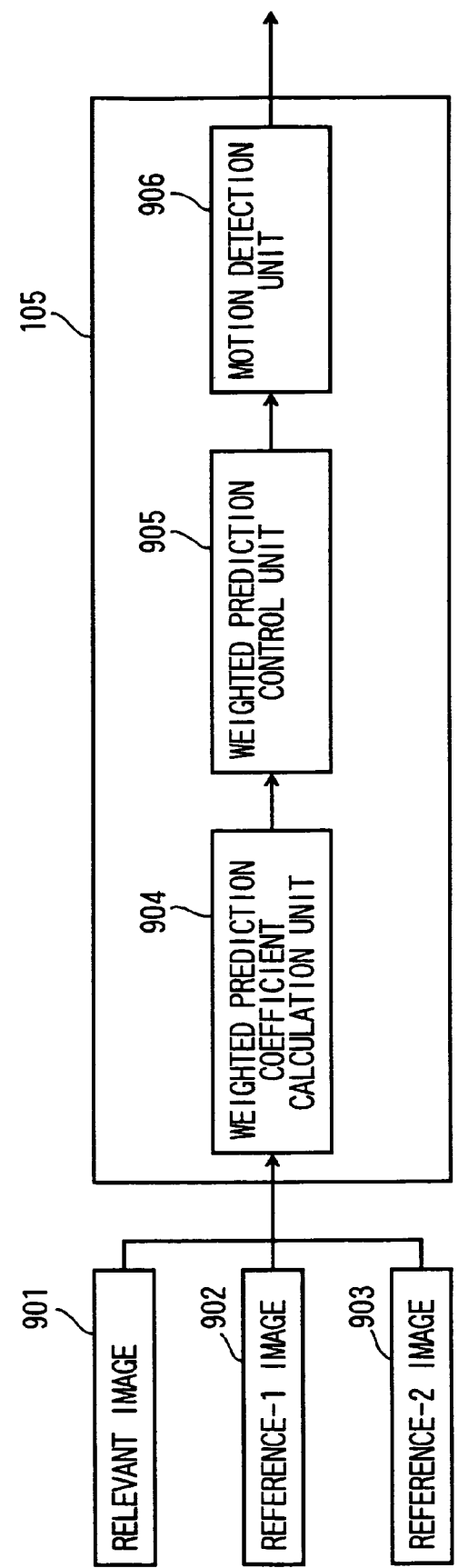
FIG. 9 is a block diagram showing a structure of a motion detection unit of an eighth embodiment.

In the eighth embodiment, although the structure is basically the same as the first embodiment shown in FIG. 1, the structure of the motion detection unit 105 in the first embodiment shown in FIG. 1 is replaced by that shown in FIG. 9.

The input to the motion detection unit 105 is a relevant image 901, a reference-1 image 902, and a reference-2 image 903. It is assumed that a motion detection unit 906 has such specs that motion detection can be performed for three images of the reference-1 image 902, the reference-2 image 903 and the weighted reference-1 image 902 or the weighted reference-2 image 903. Thus, the weighted prediction is applied to one of the reference-1 image 902 and the reference-2 image 903, and this control is performed by a weighted prediction control unit 905.

(1) Structure of the Motion Detection Unit 105

FIG. 9 is a block diagram showing the structure of the motion detection unit 105.

The motion detection unit 105 includes a weighted prediction coefficient calculation unit 904, the weighted prediction control unit 905, and the motion detection unit 906. The weighted prediction includes, for example, "Weighted Prediction" of H.264 standards.

(2) Processing of the Motion Detection Unit 105

Figure 19:
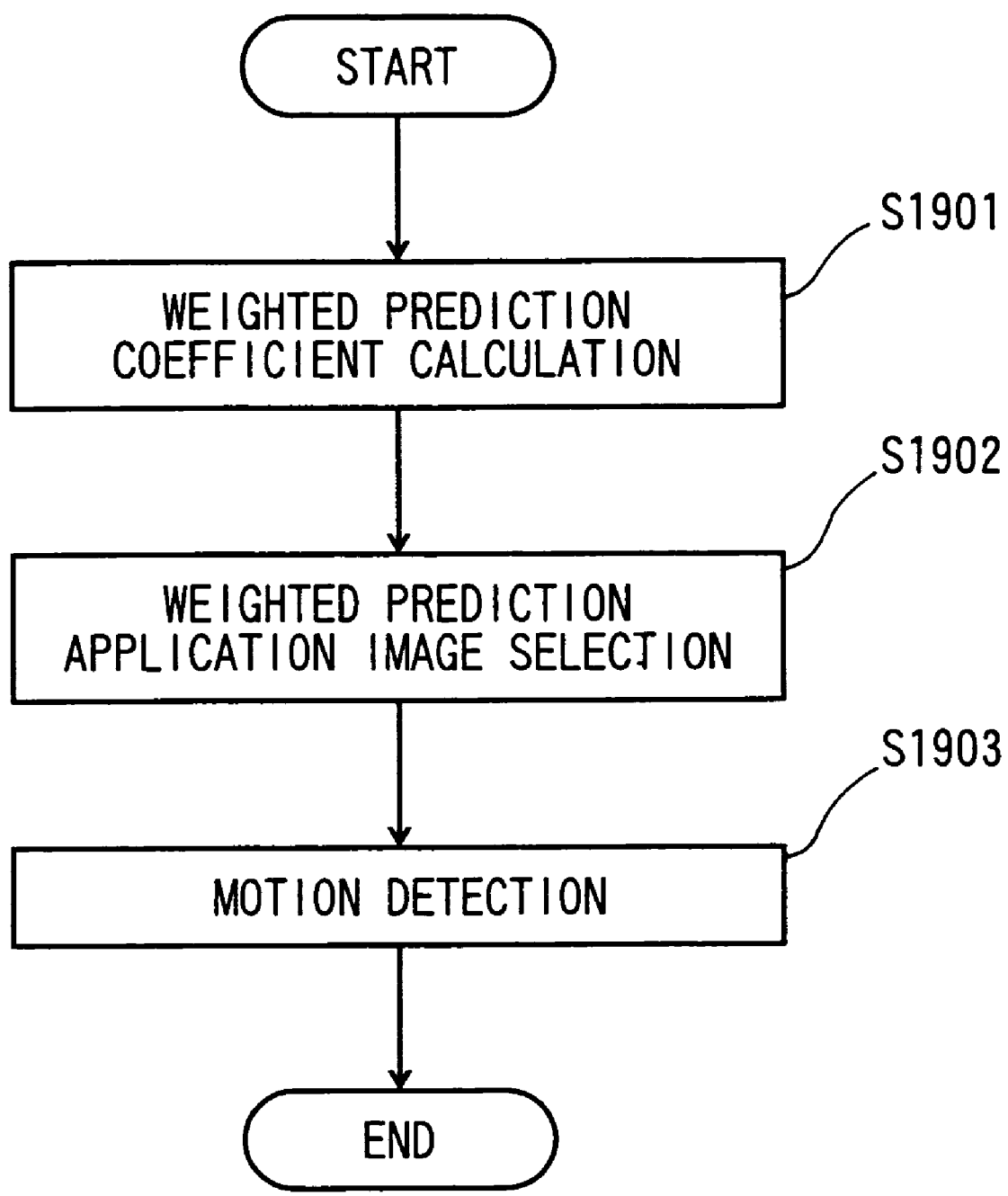
FIG. 19 is a flowchart showing a processing of the motion detection unit of the eighth embodiment.

FIG. 19 is a flowchart of the motion detection unit 105 shown in FIG. 9.

(2-1) Step S1901

The weighted prediction coefficient calculation unit 904 calculates such a weighted prediction coefficient that a difference between the relevant image 901 and the reference-1 image 902 becomes minimum. Besides, the weighted prediction coefficient calculation unit 904 calculates also a weighted prediction coefficient for the relevant image 901 and the reference-2 image 903.

(2-2) Step S1902

The weighted prediction control unit 905 compares the weighted prediction coefficient of the reference-1 image 902 and the weighted prediction coefficient of the reference-2 image 903, and assigns a weight to an image having a smaller weighted prediction coefficient.

FIG. 12 shows the reason why such selection is performed.

In an image (in FIG. 12, weighted reference-2 imag) generated by assigning a weight to an image (in FIG. 12, reference-2 image) having a smaller information amount, encoding distortion is increased. In an image (in FIG. 12, weighted reference-1 image) generated by assigning a weight to an image (in FIG. 12, reference-1 image) having a larger information amount, encoding distortion is decreased. That is, it is understood that as compared with the prediction from the weighted reference-2 image having the small information amount, the prediction from the weighted reference-1 image having the large information amount does not receive the influence of the encoding distortion, and accordingly, the prediction error signal is suppressed to be small, and the efficiency is good.

(2-3) Step S1903

The motion detection unit 906 performs the motion detection for the three images of the reference-1 image 902, the reference-2 image 903, and the weighted reference-1 image 902 or the weighted reference-2 image 903.

(3) Effects of the Embodiment

In this embodiment, the weighted prediction is not applied to the image having the small information amount, and the weighted prediction is applied to the image having the large information amount, and therefore, the processing amount of the weighted prediction in the B picture can be reduced, while the encoding performance is kept.

What is claimed is:

1. A dynamic image encoding device for performing an inter prediction, comprising:
   a fade-in detection unit configured to detect a fade-in portion of dynamic image; and
   an encoding unit configured to encode the fade-in portion of the dynamic images by using prediction from a temporally backward image,
   wherein the encoding unit includes:
      a dynamic image reverse order unit configured to take out the fade-in portion of the dynamic images detected, in order from a final image in the fade-in portion, and to arrange the dynamic images in a temporally reverse order; and
      a reverse order encoding unit configured to sequentially encode the reversely arranged images,
      wherein the reverse order encoding unit encodes the reversely arranged images by using a weighted prediction.

2. A dynamic image encoding method for performing an inter prediction, comprising:
   detecting, by a fade-in detection unit, a fade-in portion of a dynamic image; and
   encoding, by an encoding unit, the fade-in portion of the dynamic image by using prediction from a temporally backward image,
   wherein when the encoding is performed by the encoding unit,
      the detected fade-in portion of the dynamic images is taken out in order from a final image in the fade-in portion, and the dynamic images are arranged in a temporally reverse order, and
      the reversely arranged images are sequentially reverse order encoded,
      wherein when the reverse order encoding is performed, the reversely arranged images are encoded by using a weighted prediction.

* * * * *